Aug. 17, 1926.  
G. CONSTANTINESCO  
1,596,337  
APPARATUS FOR INDICATING LIQUID LEVELS  
Filed Feb. 7, 1922
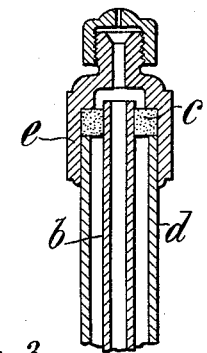
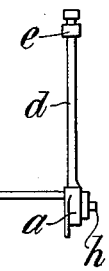
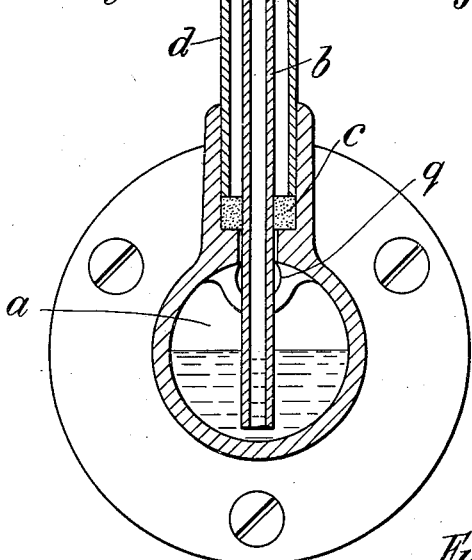
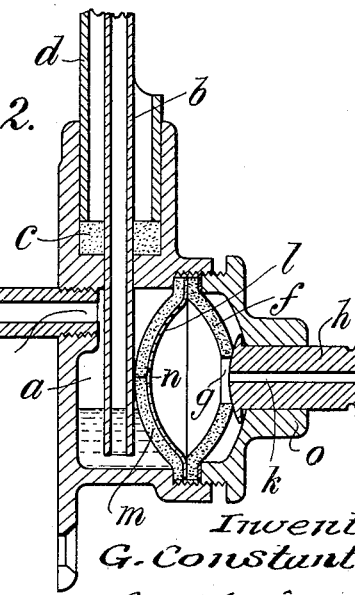
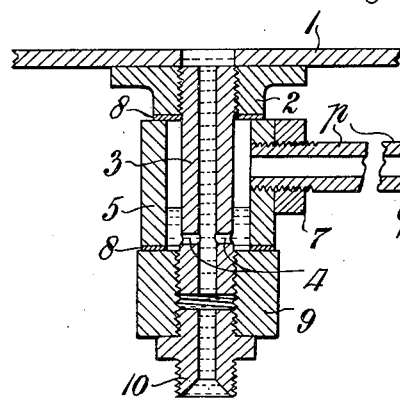
Inventor  
G. Constantinesco Patented Aug. 17, 1926.

1,596,337

UNITED STATES PATENT OFFICE.

GEORGE CONSTANTINESCO, OF WEYBRIDGE, ENGLAND.

APPARATUS FOR INDICATING LIQUID LEVELS.

Application filed February 7, 1922, Serial No. 534,748, and in Great Britain June 11, 1921.

The present invention relates to apparatus for indicating the level of liquids at a distance and is especially applicable to devices for indicating in a suitable position the level of liquid, such as fuel, in the fuel tanks of motor cars or aeroplanes.

The invention is also applicable to other purposes where it is desired to indicate at a distance the level of a liquid in a tank.

The indicating device is of the known type in which a column of liquid in the indicator is supported by air pressure, the magnitude of the air pressure being determined by the height at which the liquid stands in the tank.

In apparatus of this type, a gauge containing a liquid column is employed to indicate the level of the liquid in a tank or other container situated at a distance from the gauge; and the height of the liquid column in the gauge is determined by the air pressure existing in an air chamber in the gauge, this air chamber being connected to a pipe which is in open communication with the tank near its bottom, so that when air is compressed in the air chamber and fills the pipe in the tank, the air pressure supporting the liquid column in the gauge is substantially the same as the pressure at or near the bottom of the tank or container in which the liquid level is to be measured.

The invention consists in an improved indicating device of the above type, and in improved means for connecting it to the tank.

Referring to the accompanying drawings,

Fig. 1 is a diagram giving a general view of the whole apparatus fitted to a tank.

Fig. 2 is an enlarged view of the apparatus, and

Fig. 3 is a front sectional view of the level indicating portion of the apparatus, the section being taken through the level indicating tube.

The gauge comprises a casing 11, formed to provide a gauge chamber $a$ into which the gauge tube $b$ is inserted, being held in resilient washers $c$ $c$ at the ends of an outer tube $d$, the end of which tube $d$ is engaged by the screw cap $e$. The gauge chamber $a$ is open at one side and arranged to bridge the opening there is provided a rubber diaphragm $f$ having an aperture $g$ in its centre immediately opposite a press button $h$ which is perforated axially, the passage $k$ through the press button being adapted to be closed by the thumb when the press button is pushed in. A metal diaphragm $l$ having an aperture at its centre and a second rubber diaphragm $m$ convex in the opposite direction to the diaphragm $f$ and having a slit $n$ as shown by way of example in Figure 2, are clamped along their edges between the cap $o$ and the body of the casing $a$. The indicating liquid which may be glycerine suitably colored about half fills the space on the left hand side of the diaphragm $m$, the space above this level being filled with air and being placed in communication with a pipe $p$ leading to the tank through the aperture $q$. The open end in the pipe $p$ is situated near the bottom of the tank, as shown in Fig. 3.

With the above described device, it will be seen that if there is no liquid in the tank connected to the gauge, on pressing the button $h$ air is forced through the slit $n$ in the rubber diaphragm $m$ and passes freely out through the pipe $p$ in the tank, so that the pressure in the gauge chamber is atmospheric and no rise of the column of liquid in the gauge takes place. If there is liquid in the tank and air is forced into the gauge chamber through the rubber diaphragm $m$, by pressing in the rubber diaphragm $f$ by means of a press button $h$, the pressure in the air chamber is increased and the air forces the liquid down the pipe $p$ until, when some air escapes, the effective pressure in the air chamber in the gauge is equal to the pressure due to the height of liquid in the tank above the outlet of the pipe $p$. This air pressure acts on the indicating liquid and forces it up the gauge tube $b$. A suitable scale is provided by which the level of liquid in the tank can be directly read off from the gauge tube. The edges of the slit $n$ in the diaphragm $m$ are in contact excepting when air is being forced in. The diaphragm thus acts as a non-return valve preventing the pressure in the air chamber from falling when the press button is released.

If the air is under pressure in the tank, the upper end of the indicator is connected to the tank by a pipe instead of being open to the atmosphere.

The pipe $p$ leading to the tank is connected to a fitting shown in section in Fig. 2.

The bottom 1 of the petrol tank has attached to it by brazing or otherwise, the usual outlet connector 2. The fitting comprises a short pipe or nozzle 3 having lateral apertures 4 at its lower end, this nozzle being screwed into the connector 2. Surrounding the pipe 3, there is provided a sleeve 5 having a lateral orifice into which the pipe $p$ is screwed and locked by a nut 7, the sleeve being gripped between fibre washers 8, 8, by a hexagonal nut 9. The pipe $p$ leads to the air chamber $a$ of a gauge of the type above described. 10 is an inlet or outlet nozzle.

The operation is as follows:—

Initially the pocket within the sleeve 5 contains petrol which runs into it from the tank through the pipe 3 and the lateral openings 4 near the bottom of this pipe.

On pressing the button in the gauge, air is forced through the pipe $p$ into the air pocket forcing down the petrol in the annular chamber within the sleeve, until the petrol lever reaches the lateral apertures 4 in the pipe 3. When the petrol reaches the level, the excess air bubbles up through the tank and on releasing the button, the liquid level in the gauge remains constant, the height of the column in the gauge being equivalent to the air pressure existing in the air pocket at the bottom of the tank. By positioning this pocket at a suitable distance below the bottom of the tank, the blind portion of the gauge between the level of the liquid in the gauge chamber and the lowest point at which it is convenient to read may be allowed for, so that the zero on the gauge may be at any desired level and still accurately correspond with the level at the bottom of the tank.

Liquid level indicators manufactured as above described may be applied to the measurement of the level of liquids in tanks or other containers for other purposes than fuel and oil tanks in motor cars and aeroplanes, and the invention is of general application where it is desired to have an indication of the liquid level which can be observed at a distance from the container.

What I claim is:—

1. A device for indicating the level of liquid in petrol tanks or the like comprising in combination a casing forming an air chamber and a well for the indicating liquid, said casing being formed to receive a fitting, a fitting secured in the casing, two flexible diaphragms secured in place by said fitting one of said diaphragms being perforated and the other of said diaphragms being slit, a metal backing held by the fitting in cooperation with the slit diaphragm, said diaphragms and metal backing constituting means operative for supplying air under pressure to said air chamber, a press button for actuating the perforated diaphragm said press button being mounted in the fitting and formed with an axial air passage, a pressure indicating tube dipping into the liquid in the well and packed by resilient washers, an outer tube surrounding the said indicating tube, a tank, a fitting at the bottom of the tank, and a pipe leading from the said air chamber to the said fitting at the bottom of the tank, said air chamber containing entrapped air under pressure of the head by liquid in the tank.

2. A device for indicating the level of liquid in petrol tanks or the like, comprising in combination a nozzle or short pipe depending from the bottom of the tank, means forming a chamber surrounding the nozzle and forming with it an air trap, a manometer, said air trap being formed with a lateral orifice, a pipe connection between the said lateral orifice and the manometer, and means for supplying air to the manometer and to the said air chamber.

In testimony whereof I affix my signature.

GEORGE CONSTANTINESCO.